Dec. 13, 1932.                    F. C. WHALEN                    1,890,837
              INSTRUMENT FOR THE COMPARISON OF THE INTENSITY OF LIGHT RAYS
                                  Filed May 22, 1931
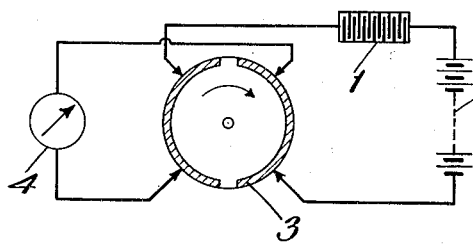
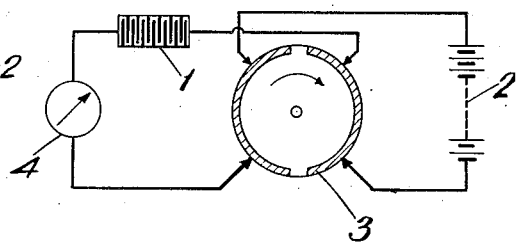
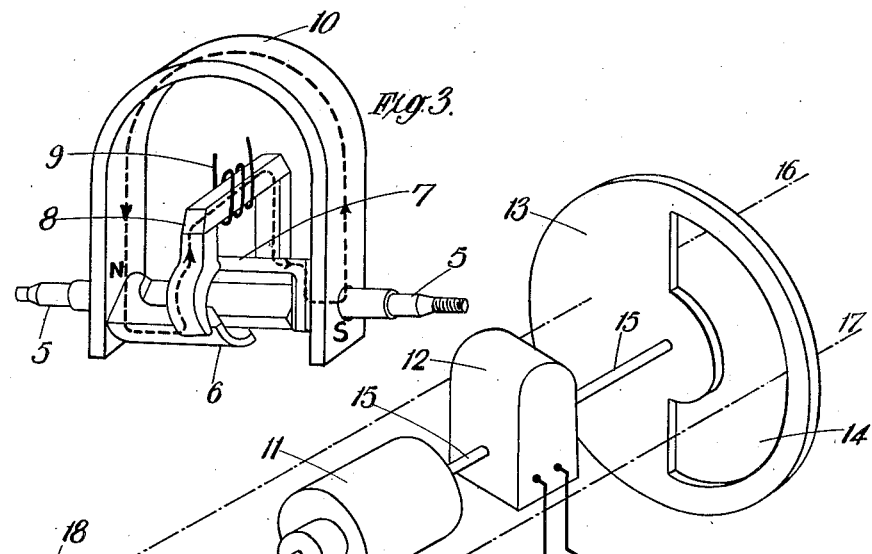
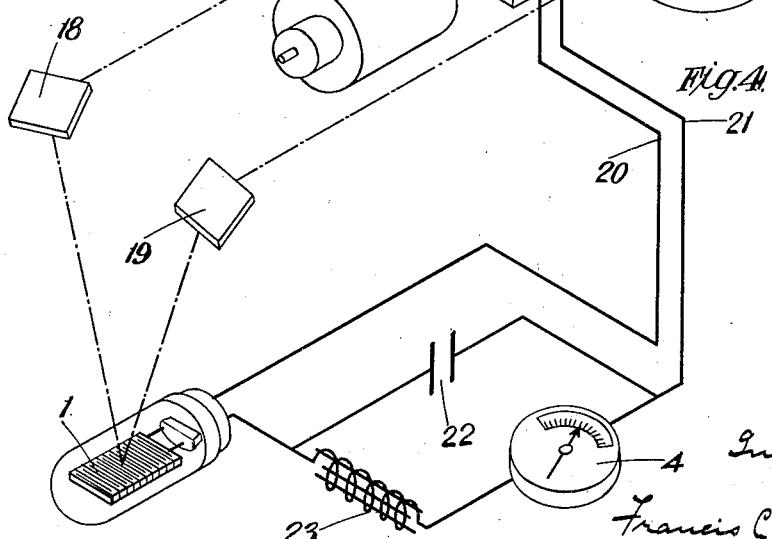

Patented Dec. 13, 1932

1,890,837

UNITED STATES PATENT OFFICE

FRANCIS CUTHBERT WHALEN, OF LONDON, ENGLAND, ASSIGNOR TO RADIOVISOR FOREIGN & COLONIAL LIMITED, OF LONDON, ENGLAND, A CORPORATION OF GREAT BRITAIN

INSTRUMENT FOR THE COMPARISON OF THE INTENSITY OF LIGHT RAYS

Application filed May 22, 1931, Serial No. 539,399, and in Great Britain May 24, 1930.

In British Patent No. 298,094 a comparative photometer was described wherein two beams of light are caused by means of a rotating shutter to fall alternately upon a light-sensitive cell. On the same shaft as the rotating shutter is a commutator by means of which the current in the galvanometer is reversed whenever the shutter obscures one beam of light and uncovers the other. The galvanometer is of the moving coil, permanent magnet type, and thus, when the two lights are of equal intensity, the deflection is zero. When the two lights are not of the same intensity, the deflection is a measure of their inequality. It is apparent that the commutator may be connected in two ways, either the light-sensitive cell being included in the battery circuit, in which case the current flowing through it will be unidirectional, or alternatively the cell may be in the galvanometer circuit, in which case the current flowing through it will be alternating. In the specification quoted special advantages are claimed for the first method in that effects of time lag and so forth in the cell are reduced, as the current in the cell is unidirectional, though fluctuating. In practice these advantages are found not to be of very great consequence and sensitivity of a similar order is obtained when the other method of connection is used.

In putting the previous invention into practice, it is found that mechanical imperfections in the commutating gear are sufficient to render the method impracticable by giving rise to unsteady and erratic galvanometer readings.

According to the present invention, therefore, the cell and the galvanometer are connected in series with a source of alternating current, the cell being illuminated alternately by the two beams of light during successive half cycles of the alternating E. M. F., this being effected by a rotating shutter driven synchronously and in suitable phase. There are three possible methods of carrying this out in practice, namely:—

Firstly, by using supply A. C. and driving the shutter from a synchronous motor. In this case the galvanometer reading may be erratic owing to interference from other apparatus on the same line.

Secondly, by using a motor generator or an alternator driven by a separate motor to supply alternating current at a suitable frequency; the shutter being mounted on the shaft of the generator. This method is likely to suffer from the same disadvantages as the original scheme as it entails brushes, slip-rings and, in the case of D. C. to A. C. motor generator, another commutator and brushes.

Thirdly, according to the preferred method, the alternating current is supplied from an inductor type generator driven by a separate motor. In this type of generator, no windings are carried on the moving member, and random fluctuations of the output E. M. F. are thus impossible.

An important feature of all these methods is the use of a direct current instrument to measure the asymmetry of the alternating current passing through the cell. The fact that the instrument has to carry the whole of this alternating current puts a practical limit to its sensitivity. Where it is desired, therefore, to use an instrument of very high sensitivity, I propose to connect in series with it a choke of high impedance and low ohmic resistance so that the total alternating current will not be carried by a galvanometer. Alternatively the alternating component may be shunted by a tuned circuit.

The invention will now be described by way of example only with reference to the accompanying drawing, in which:—

Figures 1 and 2 show circuits wherein the light-sensitive cell is subject to D. C. and A. C. respectively.

Figure 3 shows the preferred type of generator.

Figure 4 shows diagrammatically the layout of the complete machine according to a preferred form of construction.

Referring now to Figure 1, it is apparent that in this case the light-sensitive cell 1 is placed in series with the battery 2, and therefore is subject to D. C. from it. A commutator 3 is arranged as shown in such manner that A. C. is fed through the circuit containing the indicating and/or measuring instrument 4.

In Figure 2 a similar arrangement is shown to that given in Figure 1 with the exception that in this case the light-sensitive cell 1 is included in the A. C. circuit in series with the indicating and/or measuring instrument 4.

Figure 3 shows a preferred type of A. C. generator wherein no moving windings are employed. The armature 5 carries iron pole extension members 6 and 7 respectively, which on rotation of the armature alternately reverses the polarity of the stationary bridge member 8 carrying the coil 9. 10 is the permanent magnet, which as shown carries the armature 5 and influences the pole extension members 6 and 7. It will thus be seen that an alternating current will be set up in the coil 9 without the use of brushes.

Referring now to Figure 4, the motor 11, A. C. generator 12 and shutter 13 having an aperture 14 are carried upon a common shaft 15. Beams of light proceed as shown from sources 16 and 17, which it is desired to compare, to reflecting mirrors 18 and 19 respectively and thence to the light-sensitive cell 1. Electrical leads 20 and 21 are taken from the coil 9 (shown in detail in Figure 3) of the A. C. generator 12 to the light-sensitive cell and indicating instrument 4. A condenser 22 and iron cored inductance or choke 23 are connected as shown in order to shunt the alternating component from the galvanometer 4, which can then be made an instrument of high sensitivity.

It will be appreciated that the invention may be utilized either with a light-sensitive cell of the resistance type as shown or with photo-electric cells. In the latter case where necessary a subsidiary source of E. M. F. may be arranged to pass a permanent current through the cell and a second subsidiary source of E. M. F. may be connected across the galvanometer in order to reduce the deflection to zero when the two sources of light are of equal intensity.

What I claim is:—

1. An instrument of the character referred to comprising a light-sensitive cell, an indicating instrument in series with said cell, means for supplying alternating current to said cell and to said instrument, a shutter rotated in phase with said alternating current, said shutter having a slot therein, two sources of illumination for said cell, rays from said sources passing alternately through said slot whereby said cell is illuminated alternately by said sources of illumination.

2. An instrument according to claim 1, wherein the means for supplying alternating current includes a permanent magnet, an armature rotatably mounted in said magnet, pole extensions carried by said armature, a bridge member extending over said pole extensions, and a coil on said bridge member, said coil being arranged in series with said cell and said indicating instrument.

3. An instrument according to claim 1, including a motor, an A. C. generator comprising a permanent magnet, an armature rotatably mounted in said magnet, pole extensions carried by said armature, a bridge member extending over said pole extensions, and a coil on said bridge member, said coil being arranged in series with said cell and said indicating instrument.

4. An instrument according to claim 1, wherein the means for supplying alternating current includes a permanent magnet, an armature rotatably mounted in said magnet, pole extensions carried by said armature, a bridge member extending over said pole extensions, and a coil on said bridge member, said coil being arranged in series with said cell and said indicating instrument, said shutter being mounted on said armature.

5. An instrument according to claim 1 including a motor, a shaft driven by said motor, an alternating current generator, said generator comprising a permanent magnet, said shaft carrying pole extensions and forming the armature of said generator, a stationary bridge member adjacent said pole extensions, and a coil on said bridge member, leads connecting said coil to said cell and said indicating instrument, said coil, said cell and said indicating instrument being arranged in series, said shutter being mounted on said shaft.

6. An instrument according to claim 1 including a motor, a shaft driven by said motor, an alternating current generator, said generator comprising a permanent magnet, said shaft carrying pole extensions and forming the armature of said generator, a stationary bridge member adjacent said pole extensions, a coil on said bridge member, leads connecting said coil to said cell and said indicating instrument, said coil, said cell and said indicating instrument being arranged in series, said shutter being mounted on said shaft, a condenser shunting said indicating instrument, and a choke between said cell and said indicating instrument and in series therewith.

7. An instrument according to claim 1 including a motor, a shaft driven by said motor, an alternating current generator, said generator comprising a permanent magnet, said shaft carrying pole extensions and forming the armature of said generator, a stationary bridge member adjacent said pole extensions, a coil on said bridge member, leads connecting said coil to said cell and said indicating instrument, said coil, said cell and said indicating instrument being arranged in series, said shutter being mounted on said shaft, a condenser shunting said indicating instrument, and a choke between said cell and said indicating instrument and in series therewith, said choke being of high impedance and low ohmic resistance.

In testimony whereof, I have signed my name to this specification at London, England, this 12th day of March, 1931.

FRANCIS CUTHBERT WHALEN.